Sept. 6, 1932.  H. CHIREIX  1,875,329
FREQUENCY REGULATING SYSTEM
Filed July 9, 1927
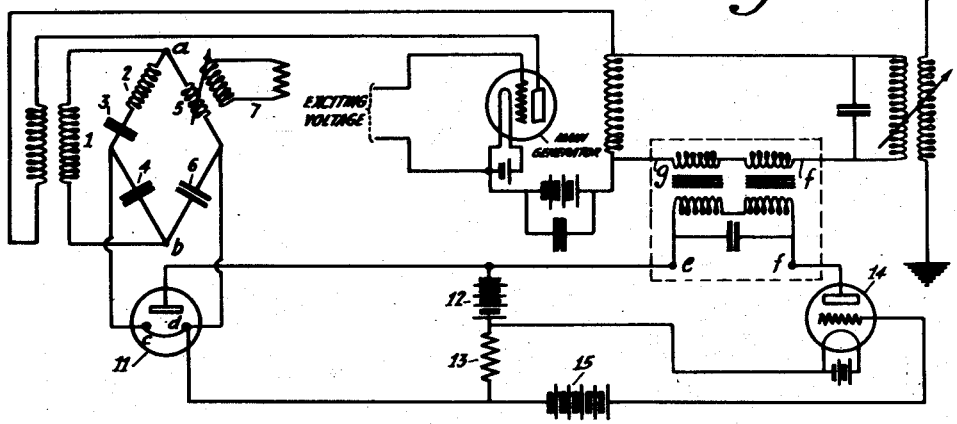
Fig.1
Fig.2  Fig.3
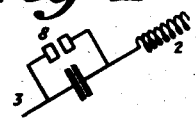
Fig.4
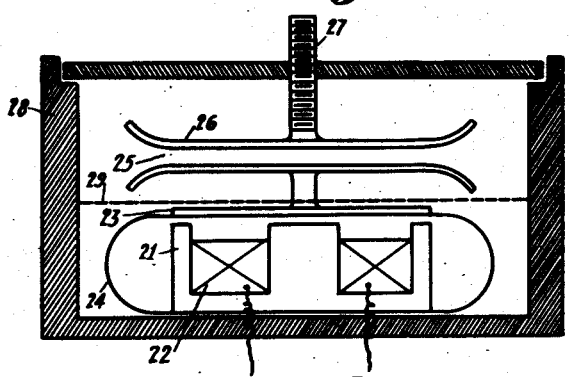
Fig.5
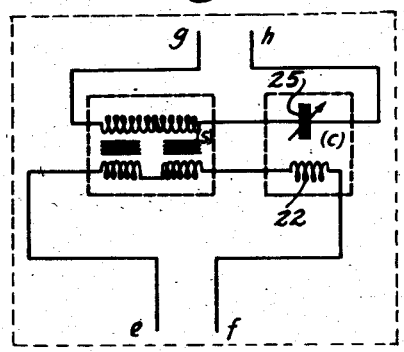
Fig.6
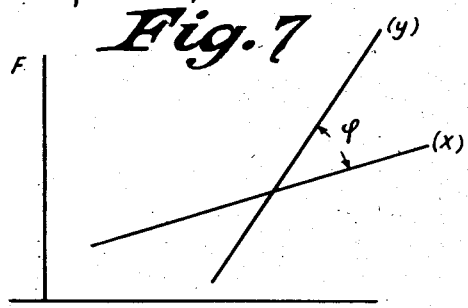
Fig.7
d.c. control current in e-f
INVENTOR
HENRI CHIREIX
BY Ira J. Adams
ATTORNEY Patented Sept. 6, 1932

1,875,329

UNITED STATES PATENT OFFICE

HENRI CHIREIX, OF PARIS, FRANCE

FREQUENCY REGULATING SYSTEM

Application filed July 9, 1927, Serial No. 204,437, and in France July 23, 1926.

In my copending application Serial No. 55,086, filed Sept. 8, 1925, which resulted in United States Patent Number 1,782,807 on November 25, 1930, I have disclosed a frequency regulator especially applicable to triode-equipped stations adapted to produce a direct current of rapidly growing amplitude, which varies with the frequency, and to then use this direct current for controlling the self-excitation frequency of the generating station by using this direct current for the purpose of saturating an iron-cored self-inductance coil. In said copending application, a number of possible modifications have been disclosed either in so far as the production of this direct current or its utilization is concerned.

The present invention has the same object in view in that it discloses another modification for the production of the direct current control current and its utilization.

In the arrangements mentioned above, the required direct current is obtained by rectifying in any desired manner a current of musical frequency obtained by causing interference between the station or equipment to be regulated and a local oscillator of very small power but perfectly stable (heterodyne method). This local oscillator or generator consists, in effect, of a standard of frequency; the efficiency and success of the scheme evidently presupposes and is predicated upon the perfect stability and constancy of this standard. Now, the method which is going to be described hereinafter replaces this local standard by an arrangement of circuits forming, as it were, and as shall be shown further below, a Wheatstone bridge arrangement which is practically balanced from the viewpoint of current amplitudes, but decidedly unbalanced from the viewpoint of phases.

This arrangement of circuits is a purely mechanical matter. Hence, it is sufficient if the construction is rigid enough and if the effects of temperature, for instance, are compensated or neutralized, in order that it may be used as a standard.

The invention will best be understood by reference to the following description taken in connection with the accompanying drawing.

Figure 1 shows a diagram of a particularly simple arrangement embodying my invention especially adapted to short and ultra-short waves. Figures 2 and 3 show explanatory diagrams. Figure 4 shows an arrangement that may be employed in connection with Figure 1 for the purpose of transmitting signals. Figure 5 shows an electromechanical frequency regulator that may be used in connection with Figure 1. Figure 6 shows diagrammatically the frequency adjusting means of Figure 1 and the frequency regulator of Figure 5 connected in series. Figure 7 represents curves illustrating the operation of Figure 6. Referring to Figure 1, 1 denotes a coil inductively coupled to a circuit of the main generator. The coil 1 constitutes a diagonal of a bridge circuit having one arm comprising the inductance 2 and capacity 3 and another arm comprising the capacity 4. A third arm of this bridge circuit includes the inductance 5 while the fourth arm of this bridge circuit includes the capacity 6. 7 denotes a circuit comprising a coupling inductance and a resistance. This circuit is coupled to 5 and is intended to introduce additional losses in the two arms 5, 6. $cd$ finally denotes the working diagonal or useful diagonal of the bridge. The bridge thus created will be balanced in phase for a frequency such that the apparent reactance of self-inductance of elements 2 and 3 associated in series compensates exactly the capacitive reactance 4, and that the capacitive reactance 6 compensates exactly the apparent reactance of self-inductance coil 5, the reaction due to the circuit 7 being duly taken into consideration.

Amplitude balance further makes it necessary that the ohmic resistance at radio frequency of the two arms 2, 3, and 4 should be equal to the ohmic resistance of the two arms 5 and 6.

In practice, capacities 4 and 6 should be given absolutely identical values, and these values should be high compared with capacity 3.

Considering the working diagonal open at $c$ and $d$, if the double balance before referred to is realized, the potentials at the terminals of 4 and 6 may be represented by two equal co-phasal vectors (Figure 2), and as a consequence the potential difference between $c$ and $d$ will be zero, being the algebraic sum of the two vectors before mentioned. These vectors as to the rest will be lagging by an angle of 90 degrees with reference to the potential between $a$ and $b$, that is, they will be directed vertically downwards if the potential between $a$ and $b$ is represented by a vector drawn horizontally from the left to the right.

Now supposing that the frequency has dropped slightly, then the state of balance of the bridge evidently will be disturbed, but it will be noted that for a small decrease in the frequency the vectors denoting the potentials across the terminals of 4 and 6 will take up the position as indicated in Figure 3, their amplitudes being practically unchanged, though their relative phase will be seriously altered.

The situation will be better understood by citing a practical and numerical example. Suppose that for the frequency of balance of the bridge the self-inductance 2 amounts to 1000 ohms reactance, the capacity 3 to 990 ohms, capacities 4 and 6, 10 ohms, reactance 5, 10 ohms and the resistance of each of the circuits 2, 3, 4, and 5, 6, to 5 ohms. The two vectors of Figure 2 will each be 10 volts if the potential difference between $a$ and $b$ is kept at 5 volts. Now, supposing that the frequency drops 1 point in 1000, then the self-inductance 2 will assume a value of 999 ohms, the capacity 3 a value of 991 ohms, capacities 4, 6, 10.01 ohms, and the reactance 5, 9.99 ohms.

The reactance of the circuit 2, 3, 4, will then be 999 − 991 − 10.01 or practically −2 ohms. Its impedance will be approximately 5 ohms, and the leading phase displacement angle of the current compared with the potential $ab$ will be given by $\tan \varphi_1 = 2/5$.

The reactance of the circuit 5, 6, will then be 9.99 − 10.01 or practically −2/100 ohm. Its impedance will be approximately equal to 5 and the leading angle of the current compared with the potential $ab$ will be given by $\tan \varphi_2 = 2/500$ and be therefore absolutely negligible.

The geometrical composition of the two vectors representing the potential difference between $c$ and $d$ after calculation amounts to 3.85 V.

If the frequency diminishes further one point in ten thousand, that is, at a rate of only 10% compared with what it was before, the resultant potential between $c$ and $d$ will change from 3.85 to 4.23 V, in other words, there will be an increase of 10%. This potential is then used for the object of directly heating the filament of a low-consumption valve, that is, a valve possessing but low thermal inertia, represented in Figure 1 by the numeral 11.

The plate of the same valve is connected series-fashion with a direct current source 12 and a resistance 13 of high value, say, 100000 ohms. Across the terminals of this resistance there is connected the grid-filament circuit of one or more three-electrode vacuum tubes 14 in parallel, a negative biasing battery 15 being interposed, the value thereof being chosen so high that, below a certain value of the current in resistance 13, the current given by these tubes will be zero. At $e$ and $f$ there is collected the control direct current which is desired to be obtained. By conveniently choosing the tubes 14, as will be seen, it is possible to insure an enormously high sensitivity. Indeed, a variation of some twenty volts at the grid is often sufficient to "explore" a whole static characteristic, and such a variation will be obtained for a variation of 0.2 milliampere of the saturation current of valve 11, and such a variation in turn can be insured by a variation of a few per cent only of the heating potential. It will be noted that under these conditions a variation in frequency of a few hundred thousandths is able to produce the complete outline of the characteristic of the tubes 14. It will moreover be noted that a decrease in the frequency results in a growth in the filament potential of the valve 11 and in the arrangement as shown in Figure 1, an increase in the current delivered in the plate circuit of tubes 14. If the control current is used in a way as disclosed in my above mentioned application, namely, for saturating an iron-cored self-inductance coil, it will be seen that every decrease in the frequency will tend to saturate this iron-cored coil and therefore to diminish its value, and consequently, tending to raise the self-exciting frequency of the main generator. Hence, one would thus operate inside a stable regulation range.

The principle underlying the operation of the bridge is that it is slightly detuned with respect to the normal frequency of oscillations. It has been pointed out above that a departure or detuning of only one percent between the two frequencies causes a phase displacement angle of arc tan 0.4 or 22°. This very small tuning is sufficient to insure the desired regulative effect. It will be noted from the above description that a difference of potential of 3.85 volts exists between terminals $c$ and $d$ when the bridge is thus slightly detuned. This condition establishes an initial magnetization of the iron core, and the high frequency winding associated therewith possesses the proper inductance for maintaining the desired frequency of oscillation. An incidental decrease in frequency causes an increase in potential across $c$ and $d$, increasing the saturation of the iron core, decreasing the inductance of the high frequency winding and, therefore, tending to increase the frequency to normal. For an accidental increase in frequency from the normal, the reverse takes place.

In accordance with a solution analogous to the one suggested in my pending application, one could key according to the Morse code, for instance, and by the method based on what is known as the compensating wave, by acting upon the capacity 3 by means of a small auxiliary capacity branched at the contacts of the keying relay 8 (as indicated in Figure 4).

It will be noted, as a matter of fact, that the change in capacity 3 results in a modification in the frequency of balance. It will be understood that the scheme of Figure 1 is merely cited here by way of example, and that the invention is not confined thereto.

When using the control current obtained in a way as indicated above, or by means disclosed in my pending application, say, for saturating an iron-cored self-inductance coil, this gives a very rapid regulator, seeing that no mechanical inertia of any sort has to be overcome, though, on the other hand, the frequency range in which regulation is possible is generally quite limited. Indeed, if the frequency is very high and if it is desired that the saturated self-inductance should vary this frequency inside considerable proportions, high iron losses will be occasioned in the apparatus and this would mean a considerable loss in efficiency of the installation.

If, on the contrary, the control current is used for actuating a mechanical device such as a variable condenser or a variometer, the result would be sluggishness in action on account of the inertia inherent in these devices, though the latter could be dimensioned so amply, without fearing undue losses, that the frequency regulation range becomes comparatively large. It has been found in practice that it is desirable to combine these two systems or principles, and this amounts practically to the connection in series of two regulators, one of which is of rapid action and covers a relatively small frequency band, while the other one is slow and covers a far more considerable frequency range. Figure 5 shows an embodiment which is of practical importance and interest and comprises a variable condenser actuated electrodynamically and is adapted to the desired end.

Referring to Figure 5, 21 is an electromagnet of the circular type, 22 is its inducing (field) coil, and 23 the keeper held by retractile springs 24. This keeper is made integral with the mobile armature 25 of an air-type condenser, whose stator armature 26 may be regulated by means of a screw 27, the assembly being immersed in a vat 28 filled up to the level 29 with a sufficiently viscous oil.

The operation of the arrangement will be readily understood: If the exciting current of coil 22 increases, the keeper 23 is attracted correspondingly more strongly until the spring 24 balances the force of attraction. The distance between the armatures 25 and 26 increases and as a consequence the capacity decreases. The object of the oil is to retard all movements by setting up strong damping.

Figure 6 shows the arrangement of two regulating devices in series, one, of the rapid and the other one, of the slow-action type, while Figure 7 shows the working curve. $e, f$, denote the incoming leads of the control direct current obtained in a way as hereinbefore explained, (S) is a self-inductance coil with saturated iron-core, (C) the electrodynamically operated condenser described in connection with Figure 5, $g, h$, is the radio frequency circuit. It will be noted that if the control current $e, f$, grows, it saturates, on the one hand, the self-inductance coil (S) whose value it diminishes, while, on the other hand, it reduces the variable capacity (C) as has been explained. The two effects are added to each other and increase the frequency of the current generated by the oscillator to which are connected the wires $g, h$. It will be seen moreover that a rapid variation causes operation of the saturated self-inductance coil (S) whereas the condenser (C) has no time to become operative.

Figure 7 shows by way of example the frequency curves obtained when the control current $i$ varies by the action of the saturated-iron self-inductance (S) (curve $x$) or by the action of the condenser (C) (curve $y$). It is desirable to proportion the elements in such a way that the angle $\phi$ will be as large as possible, and under this condition, all slow variations will, as a matter of fact, be compensated by device C, and all rapid variations will always exclusively be taken care of by device (S). It will be understood that the construction and disposition of the apparatus shown in Figure 5 is given merely by way of example, and that the same is capable of a great number of modifications.

I claim:

1. A frequency control system, comprising an oscillation generator, current control means responsive to changes in frequency associated with the generator output, tuning means connected to the oscillation circuit of the generator actuated by the current control means for maintaining the frequency substantially constant, said tuning means comprising a saturated self-inductance coil coupled to said generator output and a variable condenser inserted in said generator output circuit and control means for said condenser including a magnet having a winding in series with said saturated coil and an armature connected to an armature of said condenser.

2. A frequency regulating system, comprising an oscillation generator having an output circuit, a Wheatstone bridge circuit having a pair of conjugate points coupled to the generator output circuit, said bridge circuit being balanced as to amplitude and phase for a frequency coming very close to the desired frequency, the arrangement being such that any variation in frequency causes a variation in difference of potential across the second pair of conjugate points proportional to said frequency variation, a control circuit connected to another pair of conjugate points on said bridge circuit, and means associated with said control circuit for utilizing said variation in difference of potential for altering the electrical constants of the output circuit of the generator which govern the frequency of said circuit.

3. A control system for maintaining the frequency of transmission substantially constant comprising an oscillation generator having an output circuit, a Wheatstone bridge arrangement proximately balanced for the frequency of transmission and having a pair of conjugate points coupled to the generator output circuit, the arrangement being such that a variation in frequency in one direction causes a more decided unbalance of the bridge than a variation in the frequency in the opposite direction, current control means connected with another pair of conjugate joints on said bridge circuit and actuated by said unbalance of the bridge, and means controlled by said current control means for altering the electrical constants of the output circuit of said generator which govern the frequency of said circuit.

4. A control system for maintaining the frequency of transmission substantially constant, comprising an oscillation generator, a radio frequency Wheatstone bridge circuit associated with the generator output, said bridge circuit being balanced as to amplitude and phase at a frequency coming very close to the frequency of transmission and unbalanced as to phase at different frequencies, means for rectifying and amplifying the current due to said unbalance, and means for applying said current to the oscillation circuit of the generator.

5. A control system for maintaining the frequency of transmission substantially constant, comprising an oscillation generator, a radio frequency Wheatstone bridge circuit associated with the generator output, said bridge circuit being balanced as to amplitude and phase at a frequency coming very close to the frequency of transmission and unbalanced as to phase at different frequencies, means for rectifying and amplifying the current due to said unbalance, and a saturated self-induction coil associated with the oscillation circuit of the generator controlled by the current due to said unbalance.

6. A control system for maintaining the frequency of transmission substantially constant, comprising a vacuum tube oscillation generator, a Wheatstone bridge network detuned with respect to the frequency of oscillations and having a pair of conjugate points coupled to the generator output, frequency adjusting means associated with the generator output operatively connected to the second pair of conjugate points and responsive to variation in frequency, whereby the electrical constants of the generator output are altered to compensate for said variations in frequency.

7. A frequency control system, comprising a vacuum tube oscillator having an iron-cored inductance coil in its output circuit, a direct current circuit for controlling the saturation of said iron core and hence the inductance of the coil, a Wheatstone bridge network, one pair of conjugate points thereof being coupled to the oscillator output and the second pair operatively connected to the direct current circuit, the arrangement being such that variations in frequency above or below the desired frequency will cause the direct current circuit to saturate the iron core to a greater or less extent, whereby the electrical constants of the oscillator are altered to compensate for said variations in frequency.

HENRI CHIREIX.